US010434477B2

United States Patent
Sato et al.

(10) Patent No.: US 10,434,477 B2
(45) Date of Patent: Oct. 8, 2019

(54) FIBER-REINFORCED POROUS HOLLOW FIBER MEMBRANE

(71) Applicant: NOK Corporation, Tokyo (JP)

(72) Inventors: Takatoshi Sato, Shizuoka (JP); Kazuhiko Namigata, Shizuoka (JP); Masataka Kondo, Shizuoka (JP)

(73) Assignee: NOK Corporation, Tokyo (JP)

( * ) Notice: Subject to any disclaimer, the term of this patent is extended or adjusted under 35 U.S.C. 154(b) by 402 days.

(21) Appl. No.: 14/786,443

(22) PCT Filed: Apr. 22, 2014

(86) PCT No.: PCT/JP2014/061324
§ 371 (c)(1),
(2) Date: Oct. 22, 2015

(87) PCT Pub. No.: WO2014/175280
PCT Pub. Date: Oct. 30, 2014

(65) Prior Publication Data
US 2016/0082396 A1    Mar. 24, 2016

(30) Foreign Application Priority Data

Apr. 23, 2013 (JP) ................. 2013-090706

(51) Int. Cl.
*B01D 69/08* (2006.01)
(52) U.S. Cl.
CPC .......... *B01D 69/08* (2013.01); *B01D 69/085* (2013.01); *B01D 69/081* (2013.01); *B01D 2325/40* (2013.01)
(58) Field of Classification Search
CPC .... B01D 69/08; B01D 69/087; B01D 69/085; B01D 69/02; B01D 69/10; B01D 2325/40;
(Continued)

(56) References Cited

U.S. PATENT DOCUMENTS

| | | | |
|---|---|---|---|
| 4,061,821 A | 12/1977 | Hayano et al. | |
| 2002/0046970 A1 | 4/2002 | Murase et al. | |

(Continued)

FOREIGN PATENT DOCUMENTS

| | | |
|---|---|---|
| JP | 53-132478 | 11/1978 |
| JP | 11-319519 | 11/1999 |

(Continued)

OTHER PUBLICATIONS

English language machine translation of JP2003-245528, 12 pages, No Date.*

(Continued)

*Primary Examiner* — Pranav N Patel
(74) *Attorney, Agent, or Firm* — Brinks Gilson & Lione

(57) ABSTRACT

A fiber-reinforced porous hollow fiber membrane comprising a hollow fiber membrane and a reinforcing fiber completely or partially embedded in the hollow fiber membrane; wherein the reinforcing fiber is placed in a portion that does not exceed 90%, preferably 80%, of the thickness of the hollow fiber membrane as viewed from an inner or outer peripheral surface of the hollow fiber membrane on a side that is not a side of the porous hollow fiber membrane to come in contact with an object to be treated, and preferably at least 50 volume % of the cross section of the reinforcing fiber is embedded in the hollow fiber membrane. The obtained fiber-reinforced porous hollow fiber membrane has excellent permeability, separation performance, and mechanical properties.

3 Claims, 1 Drawing Sheet

(58) Field of Classification Search
CPC ............ B01D 2325/02; B01D 2325/04; B01D 2323/42; B01D 2323/29
See application file for complete search history.

(56) References Cited

U.S. PATENT DOCUMENTS

| | | |
|---|---|---|
| 2003/0094409 A1 | 5/2003 | Minegishi et al. |
| 2005/0258101 A1 | 11/2005 | Minegishi et al. |
| 2007/0090051 A1 | 4/2007 | Minegishi et al. |
| 2008/0292823 A1 | 11/2008 | Lee et al. |
| 2011/0108478 A1 | 5/2011 | Taguchi et al. |
| 2011/0114553 A1 | 5/2011 | Teramachi et al. |
| 2012/0097604 A1 | 4/2012 | Cote et al. |
| 2012/0156485 A1 | 6/2012 | Palinkas et al. |

FOREIGN PATENT DOCUMENTS

| | | |
|---|---|---|
| JP | 2002-166141 A | 6/2002 |
| JP | 2003-236351 A | 8/2003 |
| JP | 2003-245528 A | 9/2003 |
| JP | 2004-290751 A | 10/2004 |
| JP | 5062798 | 8/2012 |
| JP | 2012-530594 A | 12/2012 |
| WO | WO 03/097221 A1 | 11/2003 |
| WO | WO 2007/064124 A1 | 6/2007 |
| WO | WO 2009/142279 A1 | 11/2009 |
| WO | WO 2012/082441 A2 | 6/2012 |

OTHER PUBLICATIONS

International Search Report from corresponding PCT application No. PCT/JP2014/061324 dated Jul. 29, 2014 (4 pgs).
International Preliminary Report on Patentability and Written Opinion from corresponding PCT application No. PCT/JP2014/061324 dated Nov. 5, 2015 (6 pgs).

* cited by examiner

[Fig. 1]
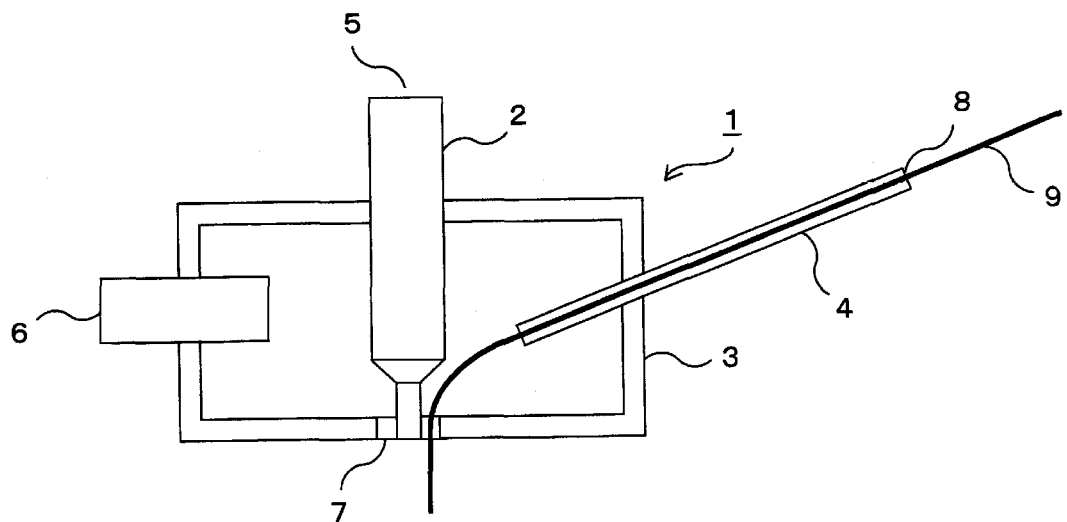
[Fig. 2]
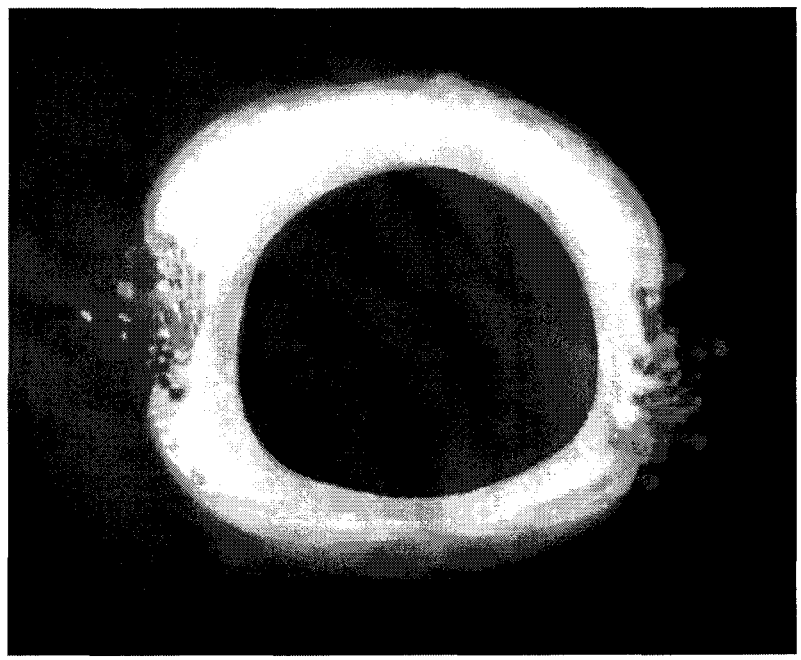

FIBER-REINFORCED POROUS HOLLOW FIBER MEMBRANE

RELATED APPLICATION

This application is a 35 U.S.C. § 371 national phase filing of International Patent Application No. PCT/JP2014/061324, filed Apr. 22, 2014, through which and to which priority is claimed under 35 U.S.C. § 119 to Japanese Patent Application No. 2013-090706, filed Apr. 23, 2013, the entire disclosure of which is hereby expressly incorporated by reference.

TECHNICAL FIELD

The present invention relates to a fiber-reinforced porous hollow fiber membrane. More particularly, the present invention relates to a fiber-reinforced porous hollow fiber membrane having excellent permeability and separation performance.

BACKGROUND ART

Porous hollow fiber membranes are used in various fields, such as water purification treatment or waste water treatment by membrane filtration, or dehumidification or humidification.

Water purification treatment or waste water treatment by membrane filtration has recently been used widely in the field of water treatment because the maintenance and monitoring of operations are easier, and the quality of treated water is better, as compared with exiting filtration systems with flocculation and sedimentation. For example, membranes used in the membrane separation treatment of a membrane reactor method [MBR] combining activated sludge treatment and membrane separation treatment are required to have high strength, durability, and chemical resistance. Accordingly, the polyvinylidene fluoride [PVDF] membranes prepared by a thermally induced-phase separation method disclosed in Patent Documents 1 and 2 are often used.

However, such PVDF membranes prepared by a thermally induced-phase separation method have a strength of about 8 to 22 MPa. Further, among these, many membranes in practical use have a strength of about 11 MPa, which is a certain level of strength, but do not always have sufficient strength, as compared with membranes prepared by a non-solvent induced-phase separation method. Moreover, the thermally induced-phase separation method has complicated steps, and requires washing with many solvents. Thus, this method causes high cost and is hardly eco-friendly.

In contrast, membrane modules (membrane area: about 10 to 100 m$^2$) having a structure in which polysulfone or PVDF and the like prepared by a non-solvent induced-phase separation method is fixed in a resin case using an adhesive are also often used in waste water treatment and water purification treatment. Such a membrane module is used such that water is supplied thereto in an amount of several 10 L to several 100 L per minute. In such a case, chemical washing or swinging washing is regularly performed to recover the flow rate; thus, the hollow fiber membrane may be broken during use or washing.

Furthermore, a method for performing dehumidification or humidification by a hollow fiber membrane system has many advantages, such as no need for maintenance and no need for a power source for driving. As such dehumidifying membranes or humidifying membranes, film-forming resin materials such as polyimide, polysulfone and polyphenylsulfone are used (e.g., Patent Document 2). Dehumidifying membranes using such materials are used in many industrial fields; however, due to their porous properties, the membranes have low absolute strength. Depending on the usage, the membranes are used under flow of a large amount of gas; therefore, the hollow fiber membranes may be broken during use. On the other hand, many humidifying membranes have recently been used to humidify the diaphragms of fuel cell stacks; however, in this case, a large amount such as about 4,000 NL/min of air flows, for example, for use in vehicle, and this may cause breakage of the hollow fiber membranes in relation to the mechanical strength.

As the method for increasing the mechanical properties of porous hollow fiber membranes, there is a method to increase the thickness of the hollow fiber membranes; however, this method is not preferable because it reduces the permeability of the hollow fiber membranes. Moreover, Patent Document 3 proposes a hollow fiber membrane obtained by forming a porous membrane layer in the outer periphery of a hollow support, such as a braid or knitted braid. In this method, the thickness of the hollow support is generally as thick as about 2 mm, which results in the inner diameter of the obtained hollow fiber membrane being larger than the thickness of the hollow support. Thus, in order to obtain the same membrane area as that when no hollow support is used, it is necessary to increase the volume of a module in which bundled hollow fiber membranes are stored. Further, since the permeation of an object to be treated occurs only in a porous layer portion placed in the gap of the hollow support, the permeability of the entire membrane may be reduced.

In contrast, Patent Document 4 proposes a porous membrane comprising a reinforcing fiber embedded in the membrane. In this method, the diameter of the hollow fiber membrane can be reduced to about 0.5 to 1.5 mm by setting the diameter of the reinforcing fiber to about 10 to 300 μm. In addition, the permeability of an object to be treated and the like is not reduced in a portion of the obtained hollow fiber membrane in which the reinforcing fiber is not embedded. Thus, the permeability of the entire membrane can be increased.

However, in some porous hollow fiber membranes obtained by this method, the reinforcing fiber may be embedded in a functional layer that largely affects the separation performance of the hollow fiber membrane, sometimes causing a significant reduction in the separation performance. For example, in soft materials such as polyester that are generally used as reinforcing fibers, when the gaps between the fibers (distance between the single fibers) are widened, meandering is likely to occur, and the reinforcing fiber may be embedded in the functional layer that largely affects the separation performance of the hollow fiber membrane. As a result, the mechanical properties such as strength and tensile elastic modulus of the hollow fiber membrane are likely to decrease. Therefore, the fiber gaps are reduced; however, air present in the narrower gaps can hardly be removed, and is likely to remain as a void of the hollow fiber membrane, which may cause poor impregnation properties.

PRIOR ART DOCUMENTS

Patent Documents

Patent Document 1: JP-B-5062798
Patent Document 2: JP-A-2004-290751

Patent Document 3: JP-A-2008-168224
Patent Document 4: JP-A-2002-166141

OUTLINE OF THE INVENTION

Problem to be Solved by the Invention

An object of the present invention is to provide a fiber-reinforced porous hollow fiber membrane comprising a hollow fiber membrane and a reinforcing fiber completely or partially embedded in the hollow fiber membrane, and having excellent permeability, separation performance, and mechanical properties.

Means for Solving the Problem

The object of present invention can be achieved by a fiber-reinforced porous hollow fiber membrane comprising a hollow fiber membrane and a reinforcing fiber completely or partially embedded in the hollow fiber membrane;
wherein the reinforcing fiber is placed in a portion that does not exceed 90% of the thickness of the hollow fiber membrane as viewed from a surface of the hollow fiber membrane on a side that is not a side of the porous hollow fiber membrane to come in contact with an object to be treated Effect of the Invention Since the position of the reinforcing fiber arranged in the hollow fiber membrane is specified, the fiber-reinforced porous hollow fiber membrane of the present invention exhibits an excellent effect of improving the mechanical properties of the porous hollow fiber membrane without impairing the permeability and separation performance inherent in the porous hollow fiber membrane.

BRIEF DESCRIPTION OF DRAWINGS

FIG. 1: A schematic half cross-sectional view showing an example of a double annular nozzle used in the production of the fiber-reinforced porous hollow fiber membrane of the present invention.
FIG. 2: A photograph showing an enlarged cross-section of a fiber-reinforced porous hollow fiber membrane obtained in an Example.

EMBODIMENTS FOR CARRYING OUT THE INVENTION

The fiber-reinforced porous hollow fiber membrane of the present invention is characterized in that a reinforcing fiber is placed in a portion that does not exceed 90%, preferably 80%, of the thickness of a hollow fiber membrane as viewed from a surface of the hollow fiber membrane (the outer or inner peripheral side of the hollow fiber membrane) on a side that is not a side of the porous hollow fiber membrane to come in contact with an object to be treated (the inner or outer peripheral side of the hollow fiber membrane), and in that preferably 50 volume % or more, more preferably 60 volume % or more, particularly preferably 70 volume % or more, of the cross section of the reinforcing fiber is embedded in the hollow fiber membrane.

Thus, when no reinforcing fiber is present in the inner or outer peripheral side of the hollow fiber membrane, which acts as a functional layer (a side to come in contact with an object to be treated) the reduction in the permeability or separation performance inherent in the porous hollow fiber membrane can be prevented. Here, in an embodiment in which the functional layer is arranged on the inner peripheral side of the hollow fiber membrane, there are cases such as that the hollow fiber membrane is used to separate steam or blood by passing it through the membrane. In contrast, in an embodiment in which the functional layer is arranged on the outer peripheral side, there are cases such as that the hollow fiber membrane is used to separate sewage and waste water by passing it through the membrane. Moreover, desired mechanical properties can be imparted to the porous hollow fiber membrane by embedding 50 volume % or more of the cross-section of the reinforcing fiber in the hollow fiber membrane.

The method for producing such a fiber-reinforced porous hollow fiber membrane is not particularly limited as long as the reinforcing fiber can be placed in a desired position. For example, the fiber-reinforced porous hollow fiber membrane is produced by the following methods:
(Production Method Example 1)
When wet spinning or dry-wet spinning is performed by discharging a core liquid from the inner nozzle of a double annular nozzle, and a spinning dope from the outer nozzle, a reinforcing fiber is supplied into the outer nozzle in a desired portion using a reinforcing fiber introducing pipe.
(Production Method Example 2)
Wet spinning or dry-wet spinning is performed using a triple annular nozzle having a triple ring structure comprising an inner nozzle, a middle nozzle, and an outer nozzle in this order, wherein a core liquid is introduced into the inner nozzle, a reinforcing fiber and a spinning dope are introduced into the middle nozzle, and the spinning dope is further introduced into the outer nozzle.

In either production method, the annular nozzle is preferably selected so that the obtained fiber-reinforced porous hollow fiber membrane has an outer diameter of about 0.5 to 1.5 mm. When fiber-reinforced porous hollow fiber membranes having such an outer diameter are bundled to form a membrane module, the module volume can be reduced. Correspondingly, since the thickness of the fiber-reinforced porous hollow fiber membrane is set to about 100 to 500 µm, preferably about 100 to 300 µm, the fiber to be embedded therein has a fiber diameter of about 10 to 500 µm, preferably about 100 to 300 µm.

In Production Method Example 1, when the core liquid is discharged from the inner nozzle of the double annular nozzle, and the spinning dope is discharged from the outer nozzle, a reinforcing fiber is supplied through a reinforcing fiber introducing pipe provided in the outer nozzle so as to be able to guide the reinforcing fiber to a desired portion.

As the double annular nozzle, any conventionally used and known nozzles can be used without any particular limitation as long as they have an inner nozzle and an outer nozzle that are doubly arranged, each nozzle having a diameter corresponding to the desired size of a hollow fiber membrane. In the present invention, a double annular nozzle 1 as shown in FIG. 1 is preferably used. The double annular nozzle 1 comprises a spinning dope introducing port 6, an inner nozzle 2, and an annular body 3 provided with a hollow fiber membrane-like material discharge port 7. In an embodiment of this nozzle, the annular body 3 provided with the hollow fiber membrane-like material discharge port 7 configures the outer nozzle of the double annular nozzle 1. The hollow fiber membrane-like material discharge port 7 and the tip portion of the inner nozzle 2 are arranged to form a double annular shape that can form a hollow fiber membrane-like material having a desired thickness.

In the inside of the outer nozzle (annular body) 3, a reinforcing fiber introducing pipe 4 for introducing a reinforcing fiber 9 into the spinning dope is arranged in a state penetrating through the side surface portion of the outer nozzle 3. The reinforcing fiber introducing pipe 4 is provided penetrating through the side surface portion of the outer nozzle 3 so that one end of the pipe located outside of the outer nozzle 3 is positioned above the upper portion of the outer nozzle 3, and the other end is positioned inside of the outer nozzle 3. This is because if one end of the reinforcing fiber introducing pipe 4 located in the outside of the outer nozzle 3 is positioned below the liquid level of the spinning dope in the outer nozzle, the spinning dope overflows from the reinforcing fiber introducing port of the reinforcing fiber introducing pipe 4.

As the reinforcing fiber introducing pipe 4, those having an inner diameter that is 1.5 to 2.0 times, preferably 1.6 to 1.8 times, larger than the outer diameter (thickness) of the reinforcing fiber can be used. Since the spinning dope is pressurized in the outer nozzle (annular body 3 in FIG. 1), if the inner diameter of the reinforcing fiber introducing pipe 4 is smaller than this range, air emitted from the reinforcing fiber cannot be suitably discharged, and air bubbles remain in the nozzle, consequently leading to spinning defects or defects in the obtained hollow fiber membrane. In contrast, if the inner diameter of the reinforcing fiber introducing pipe 4 is larger than this range, the spinning dope may flow back through the reinforcing fiber introducing pipe and leak to the outside of the outer nozzle. The length of the reinforcing fiber introducing pipe 4 is not particularly limited because the position at which the spinning dope remains varies depending on the thickness of the reinforcing fiber, the diameter of the reinforcing fiber introducing pipe, and the viscosity of the spinning dope. However, in general, the length is about 200 to 250 times, preferably about 220 to 230 times, longer than the outer diameter (thickness) of the reinforcing fiber.

Using the double annular nozzle having the above structure, the inner nozzle 2 is filled with a core liquid supplied from a core liquid introducing port 5, and the outer nozzle 3 is filled with a spinning dope, followed by pressurization. The core liquid and the spinning dope are simultaneously discharged while a reinforcing fiber is supplied from the reinforcing fiber introducing pipe 4 into the outer nozzle 3. Thereby, a porous hollow fiber membrane in which the reinforcing fiber is completely or partially embedded can be obtained by a wet spinning method or a dry-wet spinning method. In FIG. 1, only one reinforcing fiber introducing pipe 4 is used; however, a plurality of reinforcing fiber introducing pipes 4 can be used. In general, the present invention includes an embodiment of a double annular nozzle provided with 1 to 8 reinforcing fiber introducing pipes 4 that are uniformly arranged on the circumference.

The reinforcing fiber 9 is preferably previously projected from the hollow fiber membrane-like material discharge port to the outside of the nozzle before the core liquid and the spinning dope are discharged from the point of view that the reinforcing fiber is completely or partially embedded in the entire length of the hollow fiber membrane. Moreover, the core liquid and the spinning dope are preferably used after evacuation in terms of preventing the introduction of undesired air.

In Production Method Example 2, the reinforcing fiber is introduced into the middle nozzle, together with the spinning dope. In this case, when the functional layer of the porous hollow fiber membrane is formed on the inner peripheral side of the hollow fiber, the reinforcing fiber is introduced along the outer peripheral surface of the middle nozzle. On the contrary, when the functional layer of the porous hollow fiber membrane is formed on the outer peripheral side of the hollow fiber, the reinforcing fiber is introduced along the inner peripheral surface of the middle nozzle.

As the reinforcing fiber, any fiber materials conventionally used as reinforcing materials can be used without any particular limitation. Examples thereof include monofilament, multifilament, spun yarn, and the like. Specific examples thereof include at least one of natural or synthetic fibers made of polypropylene, polyethylene, fluororesin, polyethylene terephthalate, polybutylene terephthalate, polyacrylonitrile, polyphenylene sulfide, polyvinyl chloride, various types of cellulose, polylactic acid, polyvinyl alcohol, polyamide, polyimide, aramid, or the like; metal fibers, such as stainless steel fibers and copper fibers; glass fibers; carbon fibers; and the like. Preferably used are polyethylene terephthalate fibers.

As the core liquid, a non-solvent for film-forming resins, such as water or a polyvinyl pyrrolidone aqueous solution, can be used. The polymer of the spinning dope can be any known hollow fiber membrane forming material (polymer). Examples thereof include cellulosic-based materials such as cellulose acetate, cellulose propionate, cellulose butyrate, regenerated cellulose, or mixtures thereof, and hydrophobic polymers such as polysulfone-based resin, polyether sulfone-based resin, polyvinylidene fluoride-based resin, polyacrylonitrile resin, polyimide resin, aramide resin, polypropylene resin, and polyethylene resin. Further, preferred examples of the soluble solvent for film-forming resins include alcohol or non-protonic polar solvents such as dimethylformamide, diethylformamide, dimethylacetamide, diethylacetamide, dimethyl sulfoxide, and N-methyl-2-pyrrolidone.

The fiber-reinforced porous hollow fiber membrane is produced by spinning a fiber-reinforced porous hollow fiber membrane-like material by wet spinning or dry-wet spinning, and coagulating the fiber membrane-like material using a coagulation liquid, followed by washing and drying.

EXAMPLES

The following describes the present invention with reference to an Example. In the example provided here, the functional layer is arranged on the inner peripheral side of the hollow fiber membrane; however, the present invention is not limited to the exemplified embodiment.

Example

Using a double annular nozzle (outer nozzle inner diameter: 1.2 mm, inner nozzle outer diameter: 0.6 mm, inner diameter: 0.4 mm) shown in FIG. 1, to which another reinforcing fiber introducing pipe was further added, and in which the two reinforcing fiber introducing pipes were provided so that they were uniformly arranged on the circumference and guided reinforcing fibers along the inner peripheral surface of the outer nozzle, two reinforcing fibers were passed through the inside of the reinforcing fiber introducing pipes from two reinforcing fiber introducing ports. Further, in a state where polyethylene terephthalate multifilaments (110 dtex/24 filaments: breaking strength: 6 N) used as the reinforcing fibers was projected about 1 m from the gap between the outer nozzle (annular body) 3 and the inner nozzle 2, water as a core liquid was discharged from the inner nozzle 2, and a spinning dope pressurized by a gear pump was discharged from the outer nozzle 3. They were coagulated in water (coagulation liquid) at a water temperature of 40° C., thereby obtaining a fiber-reinforced hollow fiber membrane-like material. The spinning dope used herein was composed of 20 wt. % of polyetherimide resin (Ultem 1000, produced by SABIC Innovative Plastics) and 80 wt. % of dimethylacetamide.

The fiber-reinforced hollow fiber membrane-like material was dried in an oven at 55° C., thereby obtaining a fiber-reinforced porous polyetherimide hollow fiber membrane having a functional layer on the inner peripheral surface of the hollow fiber membrane. The obtained porous polyetherimide hollow fiber membrane had an outer diameter of 700 μm and an inner diameter of 500 μm. The reinforcing fibers were inserted into 50% of the thickness of the hollow fiber membrane as viewed from a surface of the hollow fiber membrane (the outer peripheral side of the hollow fiber membrane) that was not the inner peripheral side of the hollow fiber membrane, which acts as a functional layer. 60 volume % of the single fibers (29 of 48 single fibers) was embedded in the hollow fiber membrane. The steam transmission rate at 25° C. was 0.42 g/cm$^2$/min/MPa, and the air transmission rate was 0 ml/cm$^2$/min/100 kPa. Moreover, the strength measured by performing a tensile test (inter-marked line distance: 50 mm, test speed: 20 mm/min) was 10 N.

Comparative Example 1

In the Example, a double annular nozzle provided with two reinforcing fiber introducing pipes so as to guide reinforcing fibers along the outer peripheral surface of the inner nozzle was used to obtain a fiber-reinforced porous hollow fiber membrane in which polyethylene terephthalate multifilaments were partially embedded in the inner peripheral side of the porous hollow fiber membrane, which acts as a functional layer. The obtained porous hollow fiber membrane had an outer diameter of 700 μm and an inner diameter of 500 μm. The reinforcing fibers were inserted into a portion including the inner peripheral surface of the hollow fiber membrane at a position being 60 to 130% of the thickness of the hollow fiber membrane as viewed from a surface of the hollow fiber membrane (the outer peripheral side of the hollow fiber membrane) that was not the inner peripheral side of the hollow fiber membrane, which acts as a functional layer. The strength was 10 N; however, the air transmission rate at 25° C. was 20 ml/cm$^2$/min/100 kPa. Thus, the membrane could not tolerate being used as, for example, a humidifying membrane having a functional layer on the inner peripheral side of a hollow fiber membrane.

Comparative Example 2

In the Example, a porous hollow fiber membrane was obtained without using polyethylene terephthalate multifilaments. The obtained porous hollow fiber membrane had an outer diameter of 600 μm and an inner diameter of 400 μm, and had a steam transmission rate at 25° C. of 0.45 g/cm$^2$/min/MPa and an air transmission rate of 0 ml/cm$^2$/min/100 kPa; however, the strength was as low as 1 N. Thus, the membrane could not tolerate being used as, for example, a humidifying membrane.

Comparative Example 3

In the Example, in place of the core liquid, a hollow support composed of polyethylene terephthalate fibers (braid; inner diameter: 2.0 mm and outer diameter: 2.85 mm at zero load) was used from the inner nozzle, and a polyetherimide spinning dope was applied to the support. The obtained porous hollow fiber membrane had an outer diameter of 2,300 μm and had a high strength of 250 N or more; however, the steam transmission rate at 25° C. was as low as 0.04 g/cm$^2$/min/MPa. Thus, the membrane could not tolerate being used as, for example, a humidifying membrane having a functional layer on the inner peripheral side of a hollow fiber membrane. The air transmission rate was 0 ml/cm$^2$/min/100 kPa.

REFERENCE SIGN LIST

1: Double annular nozzle
2: Inner nozzle
3: Outer nozzle (annular body)
4: Reinforcing fiber introducing pipe
5: Core liquid introducing port
6: Spinning dope introducing port
7: Hollow fiber membrane-like material discharge port
8: Reinforcing fiber introducing port
9: Reinforcing fiber

The invention claimed is:

1. A fiber-reinforced porous hollow fiber membrane comprising a hollow fiber membrane and one or more reinforcing fibers that do not define a structure that extends continuously around a circumference of the hollow fiber membrane, wherein the one or more reinforcing fibers are partially embedded in the hollow fiber membrane; and
wherein the hollow fiber membrane includes a functional side that is intended to come into contact with an object to be treated and an opposite non-functional side and the reinforcing fiber is provided in a portion of the hollow fiber membrane beginning at the non-functional side and not extending more than 90% of the thickness of the hollow fiber membrane toward the opposite functional side, and at least 50 volume % of a cross section of the reinforcing fiber is embedded in the hollow fiber membrane.

2. The fiber-reinforced porous hollow fiber membrane according to claim 1, wherein the hollow fiber membrane has an outer diameter of 0.5 to 1.5 mm.

3. A fiber-reinforced porous hollow fiber membrane comprising a hollow fiber membrane and two or more reinforcing fibers that are non-contacting and spaced apart from one another around a circumference of the hollow fiber membrane, wherein the two or more reinforcing fibers are partially embedded in the hollow fiber membrane; and
wherein the hollow fiber membrane includes a functional side that is intended to come into contact with an object to be treated and an opposite non-functional side and the reinforcing fiber is provided in a portion of the hollow fiber membrane beginning at the non-functional side and not extending more than 90% of the thickness of the hollow fiber membrane toward the opposite functional side, and at least 50 volume % of a cross section of the reinforcing fiber is embedded in the hollow fiber membrane.

* * * * *